UNITED STATES PATENT OFFICE.

KARL SCHIRMACHER, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

AZO DYE AND PROCESS OF MAKING SAME.

No. 837,128.　　Specification of Letters Patent.　　Patented Nov. 27, 1906.

Application filed June 1, 1906. Serial No. 319,665.

*To all whom it may concern:*

Be it known that I, KARL SCHIRMACHER, Ph. D., chemist, a citizen of the Empire of Germany, residing at Höchst-on-the-Main, Germany, have invented certain new and useful Improvements in the Process of Making an Azo Dyestuff Suitable for the Preparation of Lakes, of which the following is a specification.

By combining diazotized arthranilic acid with 2.6-naphtholsulfonic acid an azo dyestuff may be obtained which is valuable for the preparation of lakes. The lakes obtained in the usual manner with this dyestuff exhibit beautiful red tints and are distinguished by their fastness to light.

The dyestuff is obtained, for instance, as follows: 13.7 kilos of anthranilic acid are diazotized in the usual manner with twenty-five kilos of hydrochloric acid of 20° Baumé specific gravity and 6.9 kilos of nitrite. This diazo solution is introduced into a solution of twenty-five kilos of the sodium salt of 2.6-naphtholsulfonic acid and twenty kilos of sodium carbonate. The formation of the dyestuff is soon complete. When dry, the dyestuff is a red powder of bronze luster dissolved by water to a yellow-red solution. The solution in concentrated sulfuric acid is yellow-red. The lakes obtained from this dyestuff in the usual manner are of a bright-red color and exceedingly fast to light.

Having now described my invention, what I claim is—

1. The process herein described for the manufacture of a red monoazo dyestuff specially suited for the preparation of lakes, which consists in combining diazotized anthranilic acid with 2.6-naphtholsulfonic acid.

2. As a new product, the monoazo dyestuff obtained by combining diazotized anthranilic acid with 2.6-naphtholsulfonic acid, being when dry, a red powder of bronze luster, soluble in water with a yellow-red color; the solution in concentrated sulfuric acid being yellow-red; the lakes obtained from this dyestuff are of a bright red and distinguished by their great fastness to light.

In testimony that I claim the foregoing as my invention I have signed my name in presence of two subscribing witnesses.

KARL SCHIRMACHER.

Witnesses:
　JEAN GRUND,
　CARL GRUND.